(12) United States Patent
Camara et al.

(10) Patent No.: US 7,100,170 B2
(45) Date of Patent: Aug. 29, 2006

(54) SYSTEM AND METHOD EMPLOYING SCRIPT-BASED DEVICE DRIVERS

(75) Inventors: Franc J. Camara, Redmond, WA (US); Vladimir Sadovsky, Bellevue, WA (US); Lyman Cooper Partin, Bellevue, WA (US); Byron Changuion, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/012,366

(22) Filed: Dec. 14, 2004

(65) Prior Publication Data

US 2005/0108728 A1 May 19, 2005

Related U.S. Application Data

(63) Continuation of application No. 09/853,195, filed on May 11, 2001.

(60) Provisional application No. 60/203,788, filed on May 12, 2000.

(51) Int. Cl.
*G06F 13/10* (2006.01)

(52) U.S. Cl. .................................................. 719/321

(58) Field of Classification Search ........ 719/321–327, 719/328, 331, 310; 718/102, 100; 717/115, 717/124, 114; 714/38; 358/1.13

See application file for complete search history.

(56) References Cited

U.S. PATENT DOCUMENTS

| | | | | |
|---|---|---|---|---|
| 5,404,528 A | * | 4/1995 | Mahajan | 719/320 |
| 5,557,740 A | * | 9/1996 | Johnson et al. | 714/38 |
| 5,752,032 A | * | 5/1998 | Keller et al. | 719/311 |
| 5,781,720 A | * | 7/1998 | Parker et al. | 714/38 |
| 5,896,495 A | * | 4/1999 | Stein et al. | 714/38 |
| 6,094,221 A | * | 7/2000 | Andersion | 348/231.6 |
| 6,167,456 A | * | 12/2000 | Daur et al. | 719/321 |
| 6,373,507 B1 | * | 4/2002 | Camara et al. | 715/825 |
| 6,587,129 B1 | * | 7/2003 | Lavendel et al. | 715/776 |
| 6,662,241 B1 | * | 12/2003 | Bauer et al. | 710/8 |
| 6,698,012 B1 | * | 2/2004 | Kossatchev et al. | 717/126 |
| 6,912,693 B1 | * | 6/2005 | Camara et al. | 715/771 |
| 2002/0004852 A1 | * | 1/2002 | Sadovsky et al. | 709/321 |

OTHER PUBLICATIONS www.microsoft.com, Window Imaging Architecture—WIA, updated Dec. 4, 2001, pp(6).*
www.microsoft.com, Still Image Devices, 2004, pp(4).*

* cited by examiner

*Primary Examiner*—Sue Lao
(74) *Attorney, Agent, or Firm*—Microsoft Corporation

(57) ABSTRACT

A computer system and method uses script-based device drivers for operating hardware devices. The script-based driver architecture comprises a scripting driver, a script engine, and a driver script for a given hardware device, such as a scanner. The driver script is generally a text file containing a sequence of programming instructions defining the operational behavior of the hardware device. The scripting driver exports a set of objects whose functions can be called by the driver script to communicate with and control the device. When a request to operate the hardware device is received by the scripting driver, the script engine interprets the programming instructions in the driver script corresponding to the request and invokes the functions of the scripting driver objects called by the programming instructions to carry out the requested device operation.

4 Claims, 4 Drawing Sheets

SYSTEM AND METHOD EMPLOYING SCRIPT-BASED DEVICE DRIVERS

CROSS REFERENCE TO RELATED APPLICATIONS

This is a continuation of application Ser. No. 09/853,195, filed May 11, 2001, titled "SYSTEM AND METHOD EMPLOYING SCRIPT-BASED DEVICE DRIVERS", which claims the benefit of U.S. Provisional Application No. 60/203,788, filed May 12, 2000, each of which is hereby incorporated herein by reference.

TECHNICAL FIELD OF THE INVENTION

This invention relates generally to computer operating systems, and more particularly to software components of an operating system for controlling the operation of a computer hardware device, such as a scanner.

BACKGROUND OF THE INVENTION

A computer system may employ various hardware devices for different functions, such as data input and output, printing, display, etc. Each hardware device in the computer system is typically operated through its associated device driver, which is in most cases supplied by the vendor of the hardware device and loaded as part of the operating system. The device driver allows the computer operating system and applications to communicate with the hardware device and control its operations. The device driver is device-specific in that it is written to handle the particular behavior of the device. In this regard, device drivers often rely on libraries provided by the hardware vendors to communicate with their associated devices. On the other hand, the device driver also has to be written according to specifications and requirements of the operating system with which the driver is to be used.

Although the quality of the device driver for a hardware device is critical to the proper operation of the device, many hardware vendors find it difficult to put in the needed time and resources to adequately develop a device driver. This problem is exacerbated by the frequent need to create device drivers for new hardware device models or to rewrite device drivers for use with new versions of operating systems. Also, to support a new driver, the hardware vendor may have to develop a new library. The need to code new device drivers and libraries can be a significant burden on the hardware vendors.

The task of developing device drivers and libraries is also shared by developers of operating systems. Before a device driver can be incorporated into an operating system, the operating system developer often has to test it to identify errors in the driver and its libraries. Fixes to a driver library have to be done by the hardware vendor and then merged into the current version of the library. To effectively test a driver and its libraries, the operating system developer has to have a good understanding of the libraries, such as what each library does and which device models it supports. This requirement puts a significant burden on the operating system developer. Thus, the difficulties in creating device drivers concern not only hardware vendors but also operating system developers.

SUMMARY OF THE INVENTION

In view of the foregoing, the present invention provides a computer system and method that uses script-based device drivers for operating hardware devices. The script-based driver architecture comprises a scripting driver, a script engine, and one or more driver scripts. The scripting driver interfaces with the operating system for receiving requests from applications and/or the operating system to operate the hardware device. For each hardware device, there is an associated driver script that is generally a text file containing a collection of programming instructions. The driver script defines the behavior of the hardware device in response to requests and notifications received by the scripting driver from the applications and the operating system. It also defines how to process requests and notifications from the hardware device. The scripting driver may export objects having functions that can be called by the instructions in the driver script to communicate with and control the device. When a request to operate the device is received by the scripting driver, the scripting driver uses the script engine to access and execute the device script associated with the device. The script engine parses and interprets the programming instructions in the script, and invokes functions of the scripting driver objects called by the programming instructions to carry out the requested device operation.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
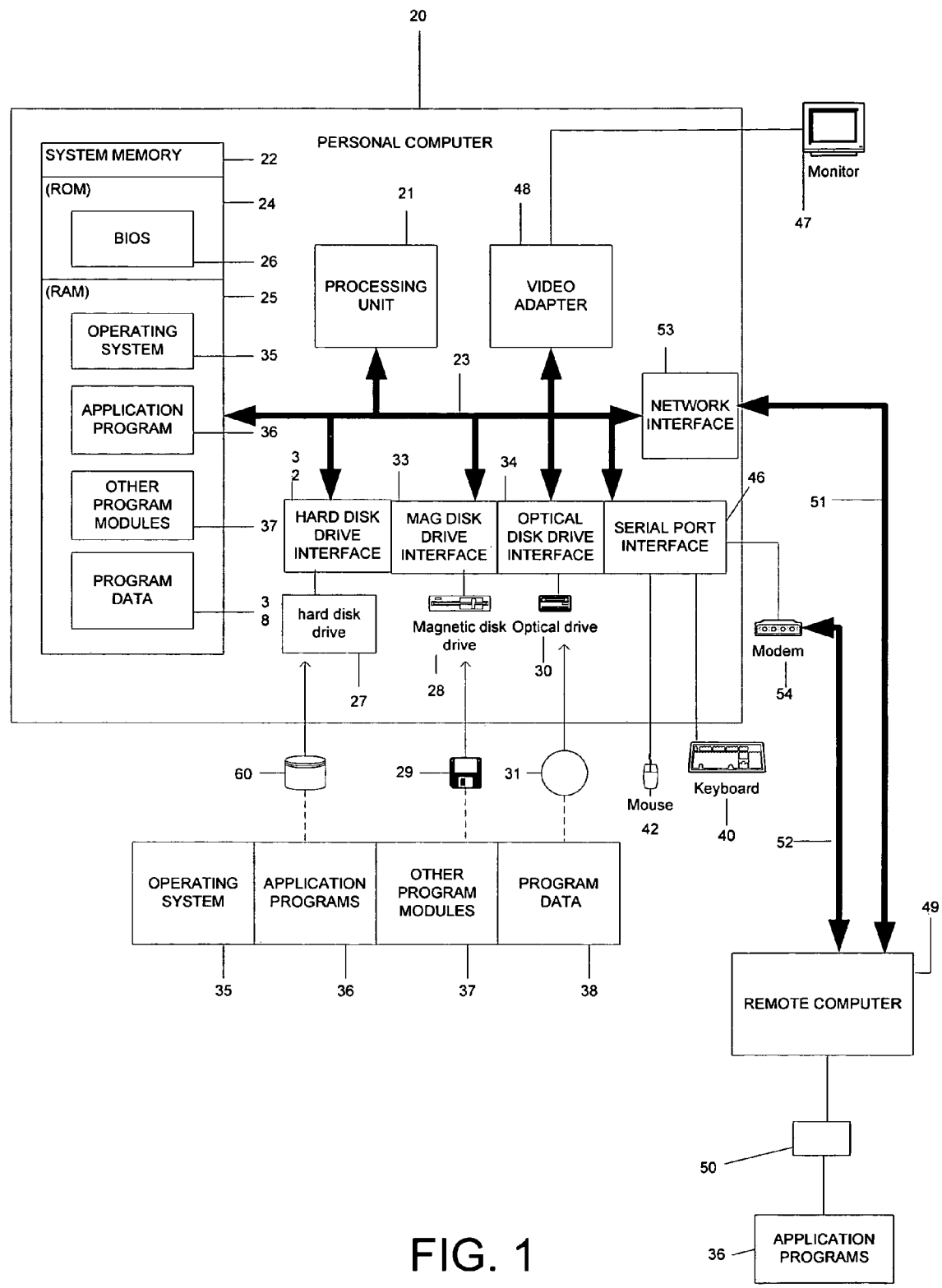
FIG. 1 is a block diagram generally illustrating an exemplary computer system on which the present invention may be performed.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general-purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices may include a microphone, joystick, game pad, or the like. The input devices may further include image-capturing devices, such as scanners and digital cameras, as sources of color image data. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting, as those of skill in the art will appreciate that the acts and operations described hereinafter and their variations may also be implemented in hardware.

Figure 2:
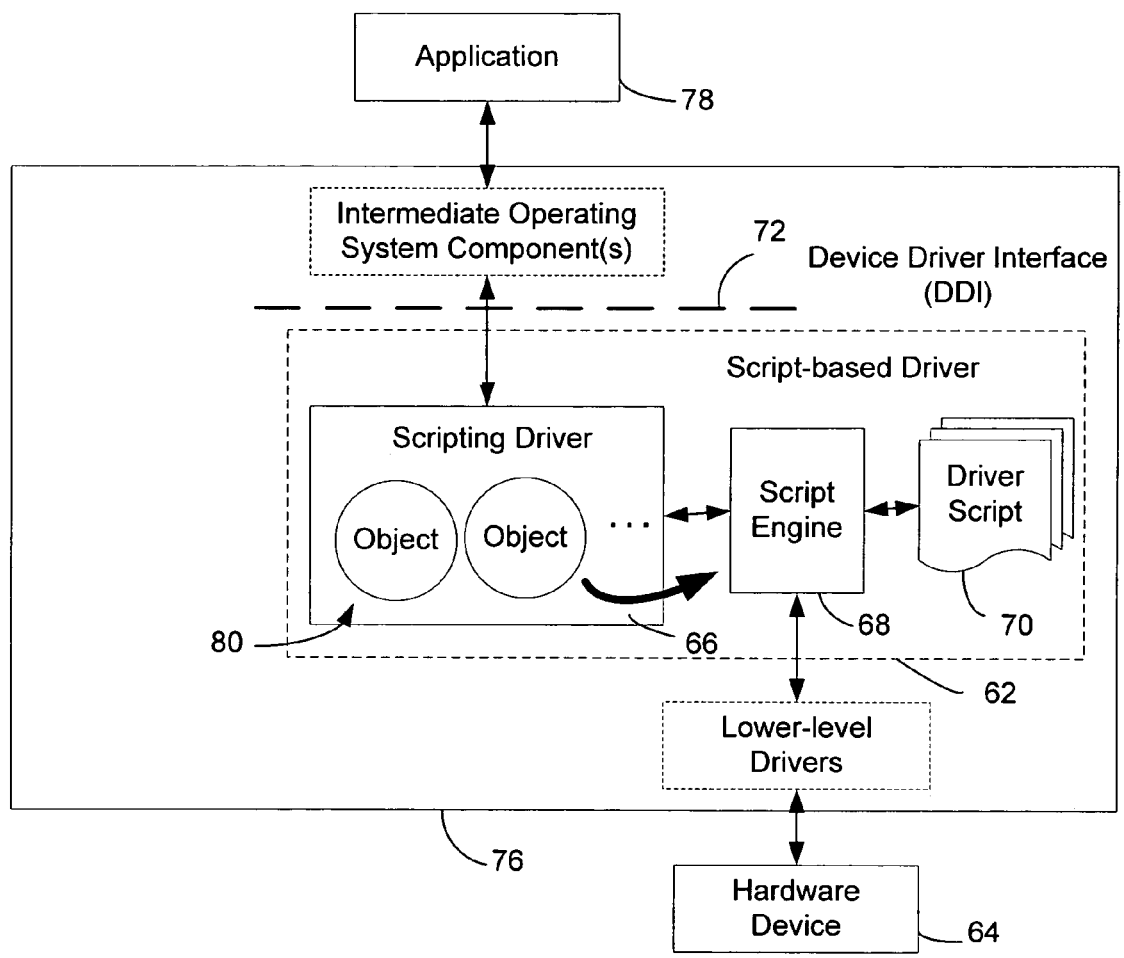
FIG. 2 is a schematic diagram showing a general view of a computer system that employs a script-based device driver in accordance with the invention.

Referring now to FIG. 2, the present invention is directed to a system architecture that enables the use of a script-based device driver 62 for controlling the operation of a hardware device 64. As will be described in greater detail below, the script-based driver architecture comprises a scripting driver 66, a script engine 68, and one or more driver scripts 70 each for a particular hardware device. The scripting driver 66, the script engine 68, and the driver script 70 for a given device together serve the function of a regular device driver (e.g., the device driver 98 in FIG. 3). The scripting driver 66 handles the various interface functions required by a device driver interface (DDI) 72 that is part of the operating system 76. Each of the driver scripts 70 is generally a text file containing a sequence of programming instructions written in a pre-defined scripting language, in contrast to a regular device driver that is a compiled and machine-executable program module. The programming instructions in the driver script define the behavior of the associated hardware device 64 in response to requests and notifications from the operating system and/or the application 78. For example, when the scripting driver receives a request to acquire data using the device, it would access and execute a portion of the driver script that is responsible for sending appropriate device-specific commands to the device to acquire data. The programming instructions in the script also define how requests and notifications from the hardware device 64 are to be handled. For example, the driver script may define how to process a notification from the device indicating that a button on the device has been pushed.

In a preferred embodiment, the scripting driver 66 also exports a plurality of objects 80 having functions that can be called by the driver script 70 to communicate with and control the hardware device 64. The objects 80 exported by the scripting driver 66 are added to the script engine 68 before executing the script and are thus callable from within the script.

The scripting driver 66 uses the script engine 68 to access the device script 70 for the hardware device. The script engine 68 processes or "interprets" the programming instructions in the script pertaining to the requested operation, and invokes the functions of the scripting driver objects 80 called by the programming instructions to carry out the requested device operation.

The scripting driver 66 is preferably provided for a given type of hardware devices, such as scanners. In other words, the operating system 76 may have multiple scripting drivers for different types of hardware devices. A scripting driver for a given device type works with a plurality of driver scripts written for different hardware devices of that type to provide device control functionality. Alternatively, a generic scripting driver may be provided for different device types, i.e., to handle driver scripts for more than one type of hardware devices. For instance, a single scripting driver may work with all types of devices falling in the category of "image capturing devices," such as scanners and digital cameras.

The scripting driver 66 is preferably system-supplied, i.e., provided by the developer of the operating system. The driver script 70, on the other hand, is expected to be provided by the vendor of the associated hardware device. One major advantage of the script-based device driver architecture is that a driver script is significantly easier to develop than a regular device driver, which would require extensive coding efforts. Moreover, since the driver script calls functions of pre-defined objects 80 provided by the system (e.g., exported by the scripting driver 66) rather than vendor-provided libraries, the developer of the operating system no longer has to spend a lot of time to understand vendor-provided libraries in order to fix the driver for a device.

In the following description, the invention will be described in the context of an embodiment based on the Windows Image Acquisition (WIA) architecture, which is part of the Windows operating system of Microsoft Corporation. Moreover, the invention will be described using scanners as an example of the different types of hardware devices for which script-based device drivers can be advantageously used. It will be appreciated, however, that the approach of employing script-based drivers in accordance with the invention can be effectively used in other types of operating systems. Moreover, the invention is not limited only to scanners but can be advantageously applied to other types of computer peripheral devices.

Figure 3:
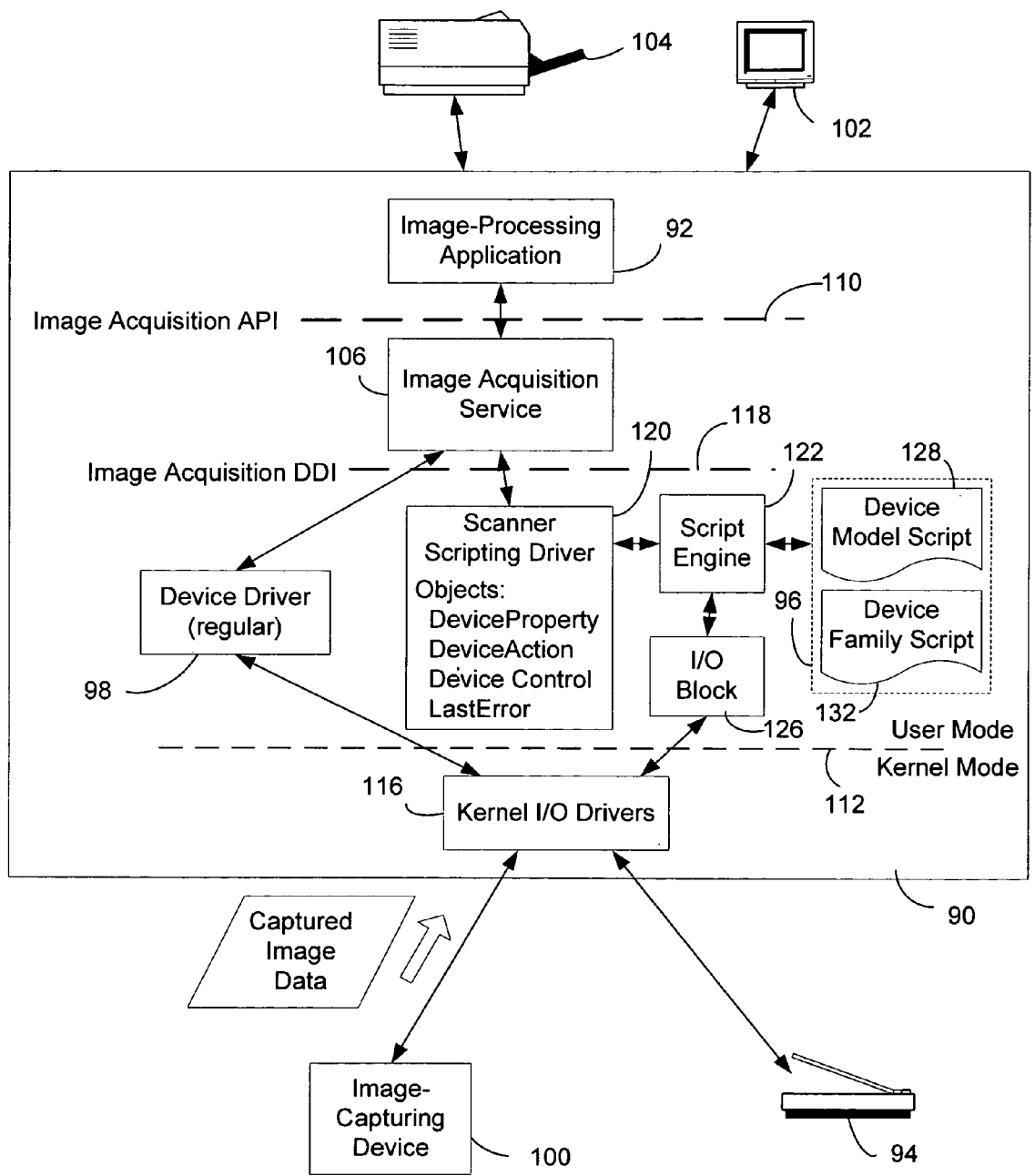
FIG. 3 is an embodiment of an image acquisition system that has a script-based device driver for controlling the operation of a scanner.

Referring now to FIG. 3, the operating system 90 of the shown embodiment employs an image acquisition architecture that is designed to enable an image-processing application 92 to effectively communicate with and control the operations of various image-capturing devices, such as scanners and digital cameras. To illustrate the concept of script-based device drivers in accordance with the invention, the components for controlling the operation of a scanner 94 according to its driver script 96 is juxtaposed with a regular device driver 98 for another image-capturing device 100, and the image acquisition architecture is described in connection with the regular device driver 98 to allow an appreciation of the advantages of using the script-based device driver.

In the embodiment of FIG. 3, the image-capturing device 100 functions as a source of image data, which may be in a color, black-and-white, or gray scale format. The image data can be transmitted to an image-processing application 92 for various types of processing and editing operations. The processed or edited image may then be displayed on a display device (such as a computer monitor 102) for viewing, printed on a printer 104, or included in a document for presentation or communication purposes.

The image acquisition architecture of the operating system 90 includes a system-supplied Image Acquisition Service 106, which servers as an intermediate between the application 92 and the device drivers for various image-capturing devices, such as the scanner 94 and the un-specified image-capturing device 100 (which may be a scanner, a digital camera, etc.). The image-processing application 92 communicates with the Image Acquisition Service 106 through an image acquisition Application Programming Interface (API) 110 provided by the operating system 90. When the application 92 makes a request to use one of the image capturing devices, the Image Acquisition Service 106 directs the request to the device driver for that image-capturing device. Communicating with the device driver 98 through the Image Acquisition Service 106, the image processing application 92 can monitor, communicate with, and receive captured image data from the image-capturing device 100.

The regular device driver 98 is typically supplied by the vendor of the associated image-capturing device 100. In the illustrated embodiment, the device driver 98 is a user-mode component that directs image acquisition property changes and commands to its associated image-capturing device 100. It communicates through a device-specific user-mode interface 112 with system-supplied or vendor-supplied kernel-mode I/O device drivers 116, which drives the image-capturing device 100 through a driver such as a USB driver. The kernel-mode image drivers 116, which are bus-specific, package data for delivery to the image-capturing device 100 and transfer data from the image-capturing device to the device driver 98. The communications between the kernel-mode image driver 116 and the image-capturing device 100 may be based on one of different types of buses. For instance, in one implementation, kernel-mode image drivers for the USB, SCSI, and IEEE 1394 buses are provided with the operating system 90.

In the opposite direction, the device driver 98 communicates with the Image Acquisition Service 106 through an image acquisition Device Driver Interface (DDI) 118. The image acquisition DDI 118 allows the Image Acquisition Service 106 to communicate with and control the device driver 98. Requests made by the application 92 concerning the image-capturing device 100 are directed to the Image Acquisition Service 106, which in turn directs the requests to the appropriate device driver 98 through the image acquisition Device Driver Interface (DDI) 118. To work with the image acquisition DDI 118, the device driver 98 is required to implement various pre-defined interface methods or "entry points" for communications with the Image Acquisition Service 106. The interface methods perform device-related tasks such as: creating a tree-like data structure (called a "device tree") with items representing the device and its images and folders; reading and writing properties of the items in the device tree; transferring captured image data from the image-capturing device; enumerating device image formats supported by the device; deleting an item in the device tree; sending operation commands to the device; enumerating device capabilities; and obtaining device error message strings.

It can be seen from the above description that to implement the required system interface methods in a device driver for an image-capturing device, a hardware vendor has to understand the architecture of the operation system and to follow carefully the specifications of the methods and their parameters. Due to the relatively large number and complexity of the required methods, the proper development of a regular device driver 98 for a hardware device can require significant time and resources. The hardware vendor may find it difficult to allocate the needed resources for driver development. Also, because regular device drivers are typically coded to use vendor-supplied libraries, the developer of the operating system often has to spend a substantial amount of time to understand the libraries in order to identify problems with the drivers.

The use of script-based device drivers in accordance with the invention effectively solves these problems. As described above, a regular device of the image acquisition system can be complex to implement, but much of the complexity is related to system requirements such as managing data structures, properties, and program flow according to the requirements of the image acquisition architecture. In accordance with the invention, much of the complexity due to system architectural requirements are moved into a reusable component (e.g., the scripting driver 66 in this embodiment), and the device-specific aspects of communicating with and controlling a hardware device are handled by a driver script for that device. Thus, rather than having to understand and implement the system architectural specifications, the hardware vendor only has to provide a script that is a human-readable text file containing simple programming instructions describing the behavior of the hardware device. The programming instructions in the script call the functions of a pre-defined set of objects provided by the system to communicate with and control the associated hardware device. It will be appreciated that writing a script is significantly easier than developing machine-executable programs, which are also much harder to debug.

Moreover, the driver interface functions required by the operating system architecture are handled by the scripting driver, which is preferably system-supplied. Thus, the hardware vendor no longer has to be concerned with implementing the system interface required in a regular driver and can concentrate on writing a simple script describing the behavior of its own hardware device. The combination of the simplicity of preparing a script in general and the removal of the burden of dealing with the complexity of system interface makes it much easier for a hardware vendor to write a driver script for use in the script-based device driver architecture of accordance with the invention.

In the embodiment of FIG. 3, a scripting driver 120 is provided for operating scanners according to their respective scripts. This scripting driver for scanners is hereinafter referred to as the "Scanner Scripting Driver." The Scanner Scripting Driver 120 uses the script engine 122 to interpret and execute the textual instructions in the driver script 96 at run-time to operate the scanner.

The Scanner Scripting Driver 120 implements the interface functions required by the image acquisition architecture for interacting with the Image Acquisition Service 106. When the Scanner Scripting Driver 120 receives a request from the application 92 through the Image Acquisition Service 106 to operate the scanner 94, it uses the script engine 122 to access the driver script 96 for that scanner. The script engine 122 reads the driver script 96, and parses and interprets the programming instructions in the pertinent portion of the script corresponding to the requested operation. When a programming instruction in the script calls a function of one of the pre-defined objects, the script engine 122 invokes the called object function. In the shown embodiment, an I/O block 126 is provided to handle all communication details with the kernel model drivers. Other files may be included, such as a script that contains general utility functions that can be common to all the driver scripts provided by a vendor.

In the illustrated embodiment, the driver script 96 for the scanner 94 includes two data files (.GSD files). One of the files is a device model data file 128, which contains features, settings, and valid value information about the scanner being operated. The other file is a device family data file 132, which contains control structures like tables, data on communication specifics, and script routines defining the common behavior of the entire family of the hardware device.

In one embodiment, an installation file (.INF) is used for installing the driver script for a scanner. The installation file performs the following tasks during installation. First, the Scanner Scripting Driver file is copied to the system directory. The data files forming the driver script for the scanner are also copied to the system directory. An entry is created in the DeviceData section of the driver registration for the device to contain the name of the device model data file. The family data file is simply referenced in the device model data file in a manner similar to the C/C++ "#include" statement. Entries are also created in the DeviceData section to define the numbers and names for communication pipes that the script engine has to create. Those pipe numbers will be references in the script instructions when a read or write operation is performed on the device. A DriverResource entry is also created in the DeviceData section to contain the name of a Resource DLL file for the device. The Resource DLL file is preferably a vendor-supplied optional resource file that contains driver specific information, error mapping, and localized strings.

As described above, the programming instructions in the driver scripts are written in a pre-selected scripting language. The scripting language used to write the driver script should have a clear grammar and be sufficiently rich to allow a clearly description of a device on a feature level as well as on a communication level. There are no particular requirements on the scripting language used. Thus, existing scripting languages, such as Jscript, VBScript, etc., or programming languages may be adapted for writing driver scripts. Alternatively, a new scripting language may be developed for this particular purpose.

Moreover, it will be appreciated that the scripting language is replaceable in that the system does not have to be tied to a particular chosen scripting language. For instance, by providing scripting engines for handling different scripting languages, the system can accommodate scripting drivers written in different existing or newly developed scripting languages.

In one embodiment, a simple scripting language has been developed for writing driver scripts. The following description describes first the syntax of the scripting language used in the embodiment and then the objects and their functions callable by the script instructions in that embodiment. It should be appreciated that the scripting language is described below only for the purpose of providing an example and should not be viewed as imposing any restrictions on the scope of the invention.

I. Script Syntax
   A. Conditional Statements

```
        if          conditional IF
        else        conditional ELSE
        while while loop
        ||          logical OR
        &&          logical AND
        !           logical NOT
        >           greater than
        <           less than
        ==          equal to
    B. Supported Operators
        +           addition operator
        -           subtraction operator
        /           division operator
        *           multiplication operator
        |           bitwise OR operator
        &           bitwise AND operator
        ~           bitwise NOT operator
    C. Functional Elements
        function    function definition keyword
        {           begin code block symbol
        }           end code block symbol
        return return keyword (function returning a value)
        goto        goto a specific label (ie. ScriptExit: )
        ;           statement termination symbol
        [           begin array symbol
        ]           end array symbol
        :           termination symbol for labels (ex. cleanup:)
        #include    include directive for additional files.
        #define     define for value associations.
    D. Data Types
        LONG        32 bit signed long value
        FLOAT       32 bit floating point value
        CHAR        8 bit signed value
        BYTE        8 bit signed value
        BOOL        32 bit signed long value (same as LONG,
                    simple TRUE/FALSE)
        structure   keyword for structure definitions
            Example of a structure:
                structure MyStruct {
                    LONG lFirstValue;
                    LONG lSecondValue;
                    BYTE TwentyBytes[20];
                    LONG TwentyLongs[20];
                };
                MyStruct TwentyStructures[20];
        //          single line comment
    E. Language Helper Functions
        CHR         Creates an escape character from an ASCII value.
        STR         Converts a numeric value into the string equal
                    (e.g., STR(100) converts
                    the number 100 to "100".)
        LEN         Length in bytes of a string, not including NULL
                    Terminator (e.g.,
                    LEN("100") equals 3).
```

An exemplary script snippet using the scripting syntax described above is given in EXAMPLE 1 below:

EXAMPLE 1

```
function BOOL IsCarriageHome( )
{
    BYTE byteValue = 'X';
    LONG ErrorCode = S_OK;
    // Write a BYTE value to the device
    DeviceControl.RawWrite(0,byteValue,1,100);
    ErrorCode = LastError.GetLastError( );
    if(ErrorCode != S_OK)
    {
        return FALSE;
    }
    // Read a BYTE value from the device
    DeviceControl.RawRead(0,byteValue,1,100);
    ErrorCode = LastError.GetLastError( );
    if(ErrorCode != S_OK)
    {
        return FALSE;
    }
    if(byteValue == 'A')
    {
        return TRUE;
    }
    return FALSE;
}
```

II. Definition of Objects Callable in Driver Scripts

As mentioned above, the programming instructions in a driver script may call functions of a pre-defined set of objects provided by the system. In the embodiment of FIG. 3, the objects are exported by the Scanner Scripting Driver 120 and include four objects named DeviceProperty, DeviceAction, DeviceControl, and LastError. These objects are described in detail below.

A. The DeviceProperty Object

The DeviceProperty object handles property initialization and direct property manipulation for the driver. By using this object, the driver script is able to modify device properties and performing validation on the property settings. The function members of the DeviceProperty object include:

SetCurrentValue(ValueID, Value)
   The script calls this function to set a device property to a specific value.

GetCurrentValue(ValueID, Value)
   The script calls this function to get the current setting of the specific property.

SetValidRange(ValueID, Min, Max, Nom, Inc)
   The script calls this function to set its valid RANGE values for a specified property.

GetValidRange(ValueID, Min, Max, Nom, Inc)
   The script calls this function to get the valid RANGE values for a specified property.

SetValidList(ValueID, ValueList)
   The script calls this function to set its valid LIST values for a specified property. The ValueList is an array of values.

GetValidList(ValueID, ValueList)
   The script calls this function to get its valid LIST values for a specified property. The first element in the list is the number of values the list contains. The size is equal to 1 plus the number of elements in the list.

GetValueAttributes(ValueID, ValueFlags)
   The script calls this function to get extended information about a specific property (e.g., RANGE, LIST, SINGLE VALUE . . . etc).

B. The DeviceAction Object

This object is used to control device communication events, including setting values to the device. Commands issued to the device will be trapped and dispatched accordingly through local functions defined within the script. The device communication process is controlled by events triggered by the Scanner Scripting Driver 120. This object includes the following data members:

Device.Action
   This data member represents an event/action that the device needs to perform.

Device.Value
   This is the value associated with a particular event/action.

Device.ValueID

This is an ID that represents the value being used in the event/action.

The device actions are defined below:

Initialize

This action is invoked by the Scanner Scripting Driver when it needs to initialize the device properties and set the current values, or to reset the device to put the values in a startup state.

SetValue

This action is evoked by the Scanner Scripting Driver when it needs to instruct the script to set a value to the device. For a scanner, the values may include, for example, X and Y resolutions, image data types, etc.

GetValue

This action is invoked by the Scanner Scripting Driver when it needs to instruct the script to retrieve a value from the device. There are times during validation that the Scanner Scripting Driver needs to verify settings with the hardware.

ResetDevice

This action resets the device to a power-on state

ScanFirst

This action starts a scanning process. A requested data size will be specified in the DeviceAction.Value data member. This call will call the ScanNext action described below and is only provided to initiate the scanning process.

ScanNext

This action starts reading data from the device. A requested chunk size will be specified in the Device-Action.Value data member. The ScanFirst Action should be invoked before this call is made.

ScanFinish

This action finishes scanning, and returns the device to its home (parked) position.

CancelScan

This action cancels the scan, and returns the device to its home (parked) position.

C. The DeviceControl Object

The DeviceControl object allows the driver script to control the hardware device. As mentioned above, in the present embodiment, all objects are exported by the Scanner Scripting Driver, so device operations are not actually executed by the script. Each read or write call will require a timeout value. If this timeout value is reached before successful communication is completed, an error will be produced. The script will be required to have provisions for checking all returns from DeviceControl calls. Separate methods are provided for different I/O pathways. This is to help the Scanner Scripting Driver manage data pipes and I/O specifics that are related to a given BUS layer. The calls are abstracted into simple Read/Write methods so the script writer does not have to be concerned with details about the BUS. A pipe-index system is used to indicate which pipe (device data handle) is needed for the read/write operation. The common helper functions mentioned above are provided for all objects, so the scriptwriter can custom fit the data to their device needs. This will also help extend any limitations place on the script writer by the scripting language.

The function members (or methods) of the DeviceControl object are described below:

RawWrite(pipenumber, srcbuffer, buffersize, timeout)

This function writes a buffer to a device and specifies the size of the data and the timeout for that operation.

RawRead(pipenumber, dstbuffer, bytestoread, bytesread, timeout)

This function reads a buffer from a device and specifies the size of the data and the timeout for that operation.

ScanRead(pipenumber, bytestored, timeout)

This function is called when the Scanner Scripting Driver is ready to read image data from the device. Internal buffers are maintained by the Scanner Scripting Driver during the scan. The script specifies the value for the parameter "bytestored", and the Scanner Scripting Driver will read only the specified amount. The Scanner Scripting Driver is also responsible for moving the internal buffer pointers.

D. The LastError Object

The LastError object is used to manage the error state of an executing script. The script calls this object to set or get error conditions on the script side. The Scanner Scripting Driver will also be able to use the same object to set or get the error conditions on the scripting driver side. The script will be able to access errors set by the Scanner Scripting Driver.

Before every call to a script operation, such as SCAN or SETXRESOLUTION, the error object is cleared to S_OK. The script will check this object before continuing the control flow. Errors on the side of the Scanner Scripting Driver can occur and may require the execution of the script to be stopped. Errors are preferably map to a 1 to 1 ratio, so the Scanner Scripting Driver can pass them directly to the calling service. If a custom device error needs to be returned, the calling script preferably specifies a resource ID associated with the error details. During installation, a script-based driver has the option to install a binary DLL that contains localized strings for error output.

The Errors may be represented in two ways. In the first way, the error code returned are mapped on a 1 to 1 basis with the error information of the image acquisition system. In the second way, the error code returned is a driver-defined error code, and requires information in a Resource DLL file for more details. In that case, a resource ID for the corresponding Resource DLL file is also returned.

The LastError object has two functions:

SetLastErrror( )

This function sets the current error code, and information about that error, so the Scanner Scripting Driver can return a proper error code to the calling service.

GetLastError( )

This function allows the script to get the current error code. The ability to detect a device specific error allows the script to alter its path to complete the desired operation.

III. Examples of Driver Scripts for a Scanner

By way of example, certain exemplary portions of driver scripts for a scanner are provided below. To facilitate an understanding of the scripts, a general data acquisition procedure for an image-acquisition device (such as a scanner) and definitions of device properties for the scanner are described first.

A. General Data Acquisition Procedure

Figure 4:
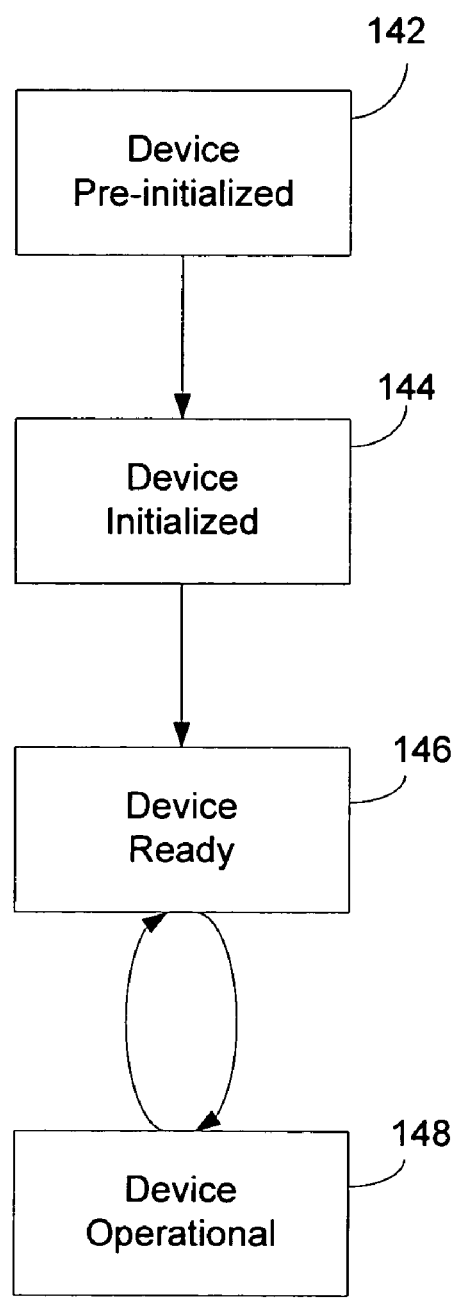
FIG. 4 is a schematic diagram showing various operational states of an image acquisition device.

Referring now to FIG. 4, the data acquisition process by an image acquisition device in the embodiment of FIG. 3 can generally divided into four device states: device pre-initialized, device initialized, device ready, and device operational. In the device pre-initialized state 142, the device is in a power-on state. All communication channels with the hardware device have also been created by the Scanner Scripting Driver.

In the device initialized state 144, basic communication verifications are done. The things to be verified include, for example, whether data can be sent to the device, and whether it is responding. Failure of the device to response causes the initialization to fail, and the driver will not be loaded. In that case, proper error codes are returned to indicate the cause of failure.

On the other hand, if communication with the device is verified, the operation moves into the device ready state 146, which is the common state for the device before and after an acquisition or when device settings are applied. In the device ready state, the device is ready for receiving communications. All the communication handles are open and are verified to be working properly. The device is "idle" and any activity causes a transition into the device operational state 148.

There are three major operations in the device operational state 148: data acquisition, setting negotiations, and setting verification. In the data acquisition operation, the device is busy acquiring data, and the acquired data are sent to the processing requesting the acquisition. If the data acquisition is somehow cancelled, the device should transition to the device ready state 146. Before that transition is made, the device is reset to a known valid state.

In the setting negotiation operation, device property values are written to the device. Failure to negotiate the settings and any failure in the writing causes a proper error code to be set to indicate the error situation (e.g., failed to write X resolution to the device, etc.). The device is then reset to a known valid state, and a transition to the device ready state 146 is made. In the setting verification operation, the device property values are validated on a device level, i.e., the device will report a setting failure via a READ or WRITE call to the device. Any failure in verification results in the setting of a corresponding error code, the resetting of the device, and a transition to the device ready state 146.

In the data acquisition process, the acquisition request specifies the size of the data to be acquired. It is up to the script to coordinate the request with the device. For example, in one scenario, the Scanner Scripting Driver may request a 100K chunk of data but the device can only handle a maximum data size of 64K. It is up to the script to break the request into one 64K chunk, and one 36k chunk. In one embodiment, all scan buffers are maintained by the Scanner Scripting Driver. The script will specify operations on data in the buffer, such as scan reads or image processing. The Scanner Scripting Driver does not return the operating buffer to the calling application until the script's operation is completed. If an error occurs, control is handed back to the script, and the script indicates the next action. For example, an error may result in a retry, or the script may indicate what to do based on the severity of the error).

B. Definition of Scanner Properties

The device properties for a scanner used in an embodiment are described below:

FIRMWAREVERSION (optional value)
    This property indicates the firmware version and its value is stated in string form only. The value is enclosed in quotes ("").

XRESOLUTION and YRESOLUTION (required values)
    These properties are the X and Y resolutions of the scan. Their current values should be in the range specified by the parameter RANDGE or in a list defined by SetValidList or SetValueRange.

BEDWIDTH and BEDHEIGHT (required values)
    These property variables specify the width and height of the scanner bed. Their values preferably are stated in multiples of 1/1000th of an inch, which is the standard unit for scanner bed sizes.

OPTICALX and OPTICALY (required values)
    These properties specify the X and Y optical resolutions, respectively, of the scanner.

BRIGHTNESS (required value)
    This property indicates the brightness of the scanner light. Its current value should be within the range stated by the property RANGE defined by SetValueRange.

CONTRAST (required value)
    This property indicates the contrast for the scan and should be within the stated range stated by the property RANGE defined by SetValueRange.

DATATYPE (required value)
    This property indicates the type of data being transferred. The current value of this property should be within the stated list defined by SetValidList.

BITDEPTH (required value)
    This property value specifies the number of bits for representing each color in the captured image data. This value should correspond to the current setting for DATATYPE.

XPOSITION, YPOSITION, XEXTENT, and YEXTENT: (required values)
    These properties represent the current x position, y position, x extent, and y extent of the scanner and should be set within the stated range defined by SetValidRange.

TPASUPPORT: (required value)
    This property indicates whether transparency adaptor support should be set. Its value is TRUE if a transparency adaptor is supported/installed, and FALSE if one is not supported/installed.

ADFSUPPORT: (required value)
    This property indicates whether Automatic Document Feeder is supported. Its value is TRUE if one is supported/installed and FALSE if one is not supported/installed.

ADFWIDTH, ADFHEIGHT, ADFVJUSTIFY, ADFHJUSTIFY & ADFMAXPAGES: (optional values)
    These properties pertain to specifics of the ADF support and are required only if the value of ADFSUPPORT is TRUE.

PIXELPACKING (required value)
    This property is used to define how the bits are arranged in the color image data generated by the scanner.

PIXELFORMAT (required value)
    This property defines the order in which the bits for the primary colors in the captured color data for a pixel are arranged. The valid values are: COLOR_ORDER_BGR and COLOR_ORDER_RGB.

DATAALIGN (required value)
    This property is used to define how the data returned from the scanner are to be aligned before being forwarded to the requesting application.

NEGATIVE (required value)
    This property indicates whether the device needs a special command send to inverse the colors of the device. It value is TRUE if a command should be sent and FALSE of no special command is needed.

C. Specific Examples of Driver Scripts for A Scanner

The following are exemplary portions of driver scripts for a scanner. EXAMPLE 2 below shows a script portion for getting data from the scanner, with error checking implemented:

EXAMPLE 2

```
OOL GetDataFromDevice( LONG lRequestedBufferSize )
{
    LONG lMaxScanRequest  = 65535; // 64k chunk
    LONG lTotalBytesToRead = lRequestedBufferSize;
    LONG lBytesToRead  = lMaxScanRequest;
    LONG ErrorCode  = ERROR_SUCCESS;
    // retry 5 times before failure occurs
    LONG lRetryCount  = 5;
    while(lTotalBytesToRead > 0)
    {
        // check for small requests
        if(lBytesToRead > lTotalBytesToRead)
        {
            lBytesToRead = lTotalBytesToRead;
        }
        // read modified chunk size into buffer
        DeviceControl.ScanRead(0,
                lBytesToRead,
                lBytesRead,
                100);
        // check for any errors from ScanRead( )
        ErrorCode = LastError.GetLastError( );
        if(ErrorCode == S_OK)
        {
            // decrement total bytes to read counter
            lTotalBytesToRead -= lBytesRead;
            // reset retry counter to five
            lRetryCount = 5;
        }
        else if(ErrorCode == E_DEVICE_TIMED_OUT)
        {
```

-continued

```
            // trap timeout error and retry up to
            // five times. After five times it is
            // considered a true failure.
            lRetryCount = lRetryCount − 1;
            if(lRetryCount <= 0)
            {
                goto GetDataFromDeviceExit;
            }
        }
        else
        {
            // some other error happened, lets set the
            // error to the appropriate context for the
            // script's current operation.
            LastError.SetLastError(SCRIPT_CUSTOM_ERROR, 5);
            goto GetDataFromDeviceExit:
        }
    }
    GetDataFromDeviceExit:
    {
        return FALSE;
    }
    return TRUE;
}
```

The following EXAMPLE 3 illustrates how device-specific properties are defined in the script portion contained in a device model data file for a scanner. For clarity of illustration, error checking has been omitted.

EXAMPLE 3

```
#include "hpsclfam.gsd" // include the operating script
function BOOL IntializeDeviceProperties( )
{
    if(MODEL == "Hewlett-Packard ScanJet 6100C")
    {
        // Initialize valid resolution array
        LONG ValidResolutions[7];
        ValidResolutions[0] = 75;
        ValidResolutions[1] = 100;
        ValidResolutions[2] = 150;
        ValidResolutions[3] = 200;
        ValidResolutions[4] = 300;
        ValidResolutions[5] = 600;
        ValidResolutions[6] = 1200;
                DeviceProperty.SetValidList(XRESOLUTION,ValidResolutions);
        DeviceProperty.SetValidList(YRESOLUTION,ValidResolutions);
        DeviceProperty.SetValidRange(XPOSITION,0,2549,2549,1);
                DeviceProperty.SetCurrentValue(XPOSITION,0);
                DeviceProperty.SetValidRange(YPOSITION,0,4199,4199,1);
                DeviceProperty.SetCurrentValue(YPOSITION,0);
                DeviceProperty.SetValidRange(XEXTENT,1,2550,1,1);
                DeviceProperty.SetCurrentValue(XEXTENT,2550);
                DeviceProperty.SetValidRange(YEXTENT,1,4200,1,1);
                DeviceProperty.SetCurrentValue(YEXTENT,4200);
    }
                else
                {
            // Initialize valid resolution array
            LONG ValidResolutions[6];
            ValidResolutions[0] = 75;
            ValidResolutions[1] = 100;
            ValidResolutions[2] = 150;
            ValidResolutions[3] = 200;
            ValidResolutions[4] = 300;
            ValidResolutions[5] = 600;
        DeviceProperty.SetValidList(XRESOLUTION,ValidResolutions);
        DeviceProperty.SetValidList(YRESOLUTION,ValidResolutions);
        DeviceProperty.SetValidRange(XPOSITION,0,2549,2549,1);
        DeviceProperty.SetCurrentValue(XPOSITION,0);
```

```
                        DeviceProperty.SetValidRange(YPOSITION,0,3506,3506,1);
                        DeviceProperty.SetCurrentValue(YPOSITION,0);
                        DeviceProperty.SetValidRange(XEXTENT,1,2550,1,1);
                        DeviceProperty.SetCurrentValue(XEXTENT,2550);
                        DeviceProperty.SetValidRange(YEXTENT,1,3507,1,1);
                        DeviceProperty.SetCurrentValue(YEXTENT,3507);
                    }
                }
                // common property settings
            DeviceProperty.SetCurrentValue(XRESOLUTION, 150);
            DeviceProperty.SetCurrentValue(YRESOLUTION, 150);
            DeviceProperty.SetValidRange(BRIGHTNESS,-127,127,32,1);
            DeviceProperty.SetCurrentValue(BRIGHTNESS,32);
            DeviceProperty.SetValidRange(CONTRAST,-127,127,12,1);
            DeviceProperty.SetCurrentValue(CONTRAST,12);
// Initialize valid data type array
LONG ValidDataTypes[3];
ValidDataTypes[0] = 0;
ValidDataTypes[1] = 2;
ValidDataTypes[2] = 3;
DeviceProperty.SetValidList(DATATYPE,ValidDataTypes)
DeviceProperty.SetCurrentValue(DATATYPE,2)
DeviceProperty.SetCurrentValue(BITDEPTH,8)
DeviceProperty.SetCurrentValue(NEGATIVE,1)
DeviceProperty.SetCurrentValue(PIXELORDER,0)
DeviceProperty.SetCurrentValue(PIXELFORMAT,1)
DeviceProperty.SetCurrentValue(BEDWIDTH,8500)
DeviceProperty.SetCurrentValue(BEDHEIGHT,11693)
DeviceProperty.SetCurrentValue(OPTICALX,300)
DeviceProperty.SetCurrentValue(OPTICALY,300)
DeviceProperty.SetCurrentValue(ADFSUPPORT,0)
DeviceProperty.SetCurrentValue(TPASUPPORT,0)
DeviceProperty.SetCurrentValue(ADFWIDTH,0)
DeviceProperty.SetCurrentValue(ADFHEIGHT,0)
DeviceProperty.SetCurrentValue(ADFVJUSTIFY,0)
DeviceProperty.SetCurrentValue(ADFHJUSTIFY,0)
DeviceProperty.SetCurrentValue(ADFMAXPAGES,30)
DeviceProperty.SetCurrentValue(FIRMWAREVER,"1.02a")
return TRUE;
}
```

The following Example 4 is another portion of a driver script for a scanner that shows how device actions are handled in the script. Error checking has been omitted for clarity.

EXAMPLE 4

```
function VOID DeviceAction_DeviceActionEvent( )
{
    // Handle initialization of device properties
    if(DeviceAction.Action == INITIALIZE_ID)
    {
        // this will call the device's specific property
        // initialization script function specified in the
        // product line file.
        InitializeDeviceProperties( );
    }
    // Handle setting a device property
    else if(DeviceAction.Action == SETVALUE_ID)
    {
        if(DeviceAction.ValueID == XRESOLUTION)
        {
            LONG DataLength = 0;
            DataLength = (4 + LEN(STR(DeviceAction.Value)));
            DeviceControl.RawWrite(0,
                CHR(27) +
                "*a" +
                STR(DeviceAction.Value) +
                "R",DataLength,100)
        }
        else if(DeviceAction.ValueID == YRESOLUTION)
        {
            LONG DataLength = 0;
            DataLength = (4 + LEN(STR(DeviceAction.Value)));
            DeviceControl.RawWrite(0,
                CHR(27) +
                "*a" +
                STR(DeviceAction.Value) +
                "S",DataLength,100)   }
        else if(DeviceAction.ValueID == XPOSITION)
        {
            LONG XresSetting = 0;
            DeviceProperty.GetCurrentValue(XRESOLUTION,
                    XResSetting);
            LONG NewXPos = DeviceAction.Value;
            NewXPos = ((NewXPos * 300) / XResSetting);
            LONG DataLength = 0;
            DataLength = (4 + LEN(STR(NewXPos)));
            DeviceControl.RawWrite(0,CHR(27) +
                "*f" +
                STR(NewXPos) +
                "X",DataLength,100)
        }
        else if(DeviceAction.ValueID == YPOSITION)
        {
            LONG YResSetting = 0;
            DeviceProperty.GetCurrentValue(YRESOLUTION,
                    YResSetting);
            LONG NewYPos = DeviceAction.Value;
            NewYPos = ((NewYPos * 300) / YResSetting);
            LONG DataLength = 0;
            DataLength = (4 + LEN(STR(NewYPos)));
            DeviceControl.RawWrite(0,CHR(27) +
                "*f" +
                STR(NewYPos) +
```

-continued

```
        "Y",DataLength,100)
}
else if(DeviceAction.ValueID == XEXTENT)
{
    LONG XresSetting = 0;
    DeviceProperty.GetCurrentValue(XRESOLUTION,
            XResSetting);
    LONG NewXExt = DeviceAction.Value;
    NewXExt = ((NewXExt * 300) / XResSetting);
    LONG DataLength = 0;
    DataLength = (4 + LEN(STR(NewXExt)));
    DeviceControl.RawWrite(0,CHR(27) +
        "*f" +
        STR(NewXExt) +
        "P",DataLength,100)
}
else if(DeviceAction.ValueID == YEXTENT)
{
    LONG YResSetting = 0;
    DeviceProperty.GetCurrentValue(YRESOLUTION,
            YResSetting);
    LONG NewYExt = DeviceAction.Value;
    NewYExt = ((NewYExt * 300) / YResSetting);
    LONG DataLength = 0;
    DataLength = (4 + LEN(STR(NewYExt)));
    DeviceControl.RawWrite(0,CHR(27) +
        "*f" +
        STR(NewYExt) +
        "Q",DataLength,100)
}
else if(DeviceAction.ValueID == DATATYPE)
{
    if(DeviceAction.Value == 0)
    {
        DeviceControl.RawWrite(0,CHR(27) + "*a0T",5,100);
        DeviceControl.RawWrite(0,CHR(27) + "*a1G",5,100);
    }
    if(DeviceAction.Value == 2)
    {
        DeviceControl.RawWrite(0,CHR(27) + "*a4T",5,100);
        DeviceControl.RawWrite(0,CHR(27) + "*a8G",5,100);
    }
    if(DeviceAction.Value == 3)
    {
        DeviceControl.RawWrite(0,CHR(27) + "*a5T",5,100);
        DeviceControl.RawWrite(0,CHR(27) + "*a24G",6,100);
    }
    else
    {
        // unsupported data type, FAIL this call
    }
}
else if(DeviceAction.ValueID == BRIGHTNESS)
{
    LONG DataLength = 0;
    DataLength = (4 + LEN(STR(DeviceAction.Value)));
    DeviceControl.RawWrite(0,
        CHR(27) +
        "*a" +
        STR(DeviceAction.Value) +
        "K",DataLength,100)
}
else if(DeviceAction.ValueID == CONTRAST)
{
    LONG DataLength = 0;
    DataLength = (4 + LEN(STR(DeviceAction.Value)));
    DeviceControl.RawWrite(0,
        CHR(27) +
        "*a" +
        STR(DeviceAction.Value) +
        "L",DataLength,100)
}
else if(DeviceAction.ValueID == NEGATIVE)
{
    DeviceControl.RawWrite(0,chr(27) + "*a1I",5,100);
}
}
// Handle getting a device property
else if(DeviceAction.Action == GETVALUE_ID)
{
}
}
// Handle getting a device property
    else if(DeviceAction.Action == RESETDEVICE_ID)
    {
    }
    // Handle starting a scan
    else if(DeviceAction.Action == SCAN_FIRST_ID)
    {
        DeviceControl.RawWrite(0,CHR(27)+"*f0S",5,100);
        GetDataFromDevice(DeviceAction.Value);
    }
    // Handle scanning data
    else if(DeviceAction.Action == SCAN_NEXT_ID)
    {
        GetDataFromDevice(DeviceAction.Value);
    }
    // Handle finishing a scan
    else if(DeviceAction.Action == SCANFINISHED_ID)
    {
        DeviceControl.RawWrite(0,CHR(27) + CHR(69),2,100);
    }
    // Handle canceling a scan
    else if(DeviceAction.Action == SCAN_CANCEL_ID)
    {
        DeviceControl.RawWrite(0,CHR(27) + CHR(69),2,100);
    }
    // Handle default case
    else
    {
        // unknown action ID
    }
}
function BOOL GetDataFromDevice(LONG lBytesToRead)
{
    LONG lBytesRead = 0;
    LONG lErrorCode = S_OK;
    DeviceControl.ScanRead(0,lBytesToRead,lBytesRead,100);
    lErrorCode = LastError.GetLastError( );
    if(lErrorCode == S_OK)
    return TRUE;
}
```

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-implemented system for controlling a hardware device, the system comprising:
    an operating system having a scripting driver, a scripting engine, and a driver script for the hardware device, the driver script containing a plurality of programming instructions defining operational behavior of the hardware device, the programming instructions calling functions of system-provided objects for communicating with and controlling the hardware device,
    the scripting driver programmed for receiving a request for a requested operation by the hardware device, and invoking the script engine to execute the driver script, the script engine programmed for interpreting the programming instructions in the driver script and invoking functions of the system-provided objects called by the programming instructions to carry out the requested operation.

2. A computer-implemented system as in claim 1, wherein the hardware device is an image-capturing device.

3. A computer-implemented system as in claim 1, wherein the hardware device is a scanner, and the requested operation is a scan operation.

4. A computer-implemented system as in claim 1, wherein the scripting driver is further programmed to export the system-provided objects called by the programming instructions in the driver script.

* * * * *